United States Patent Office 2,759,002
Patented Aug. 14, 1956

2,759,002

3-BENZYL HYDANTOIN AND PROCESS

Warren J. Close, Waukegan Township, Lake County, Ill., assignor to Abbott Laboratories, North Chicago, Ill., a corporation of Illinois No Drawing. Application March 24, 1954,
Serial No. 418,480

3 Claims. (Cl. 260—309.5)

This invention relates to a new and highly useful anticonvulsant and to a method for making the same.

The compound to which the invention relates is 3-benzylhydantoin and is characterized by the following formula:

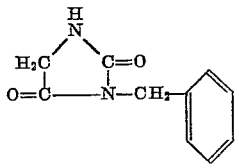

The compound is notable for its excellent activity as an anticonvulsant, combined with favorable toxicity. It has shown strong protective action against electroshock and is useful as an antiepileptic drug.

While the hydantoins are well known in the chemical art, this is the first instance in which a compound having the benzyl group in the 3 position and being unsubstituted in the 5 position has been reported. It was a surprising finding that the hydantoin which is unsubstituted in the 5 position would have such excellent anticonvulsant activity.

The following example is presented in order to define the invention more clearly but the invention is not, however, intended to be limited by the example.

*Example*

50 grams of hydantoin, 83 grams of anhydrous potassium carbonate and 103 grams of benzyl bromide are introduced into a flask fitted with a reflux condenser. 400 cc. each of acetone and water are added to the flask and the mixture refluxed overnight.

When the reaction is complete the acetone is substantially all removed by distillation and the residue is cooled and treated with ether. After further cooling the mixture is filtered and 50–58 grams of product is obtained as a solid (representing a yield of 52%–61%). The material when recrystallized from ethanol melted at 140° C.–141° C. The analysis calculated for the formula $C_{10}H_{10}N_2O_2$ is N, 14.73%. The analysis found is N, 14.83%.

Other benzyl halides such as benzyl chloride and benzyl iodide may be used in place of the benzyl bromide. Likewise other commonly known proton acceptors such as sodium carbonate, sodium ethoxide, sodium hydride, sodium hydroxide and potassium hydroxide may be used in place of the potassium carbonate. Other solvents such as ethanol and benzene may be used in place of the acetone.

Others may practice the invention in ways which will be suggested to one skilled in the art. It is contemplated, however, that all such practice will be covered by this invention provided it falls within the scope of the appended claims.

I claim:

1. 3-benzylhydantoin.

2. The method of making 3-benzylhydantoin which comprises refluxing approximately equimolar proportions of hydantoin with a benzyl halide in the presence of a proton acceptor and an aqueous solution of acetone, removing the solvent, and filtering off the solid product.

3. The method of making 3-benzylhydantoin which comprises refluxing approximately equimolar proportions of hydantoin with a benzyl halide in the presence of potassium carbonate and an aqueous solution of acetone, removing the acetone and filtering off the solid product.

References Cited in the file of this patent

UNITED STATES PATENTS 2,479,065  Gresham _____ Aug. 16, 1949

OTHER REFERENCES

Mouneyrat: Ber. Deut. Chem., vol. 33, p. 2394 (1900).
Pfau et al.: Chem. Abst., vol. 6, p. 3089 (1912).
Jordan et al.: J. Am. Chem. Soc., vol. 71, p. 2258 (1949).
MacArdle: "Use of Solvents in Synthetic Org. Chem." (Van Nostrand), pp. 1–3, 101–104 (1925).